(12) United States Patent
Takachi

(10) Patent No.: US 7,380,646 B1
(45) Date of Patent: Jun. 3, 2008

(54) ADJUSTABLE MODULATOR FOR HYDRAULIC BRAKE LEVER ASSEMBLY

(75) Inventor: Takeshi Takachi, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 0 days.

(21) Appl. No.: 11/686,267

(22) Filed: Mar. 14, 2007

(51) Int. Cl.
*B60T 13/00* (2006.01)

(52) U.S. Cl. ..................... 188/344; 60/547.1

(58) Field of Classification Search .. 188/24.14–24.16, 188/344, 351, 151 R, 152; 60/561, 562, 60/588, 533, 547.1
See application file for complete search history.

(56) References Cited

U.S. PATENT DOCUMENTS

| | | | | |
|---|---|---|---|---|
| 3,156,097 A | * | 11/1964 | Brown | 60/588 |
| 3,332,240 A | * | 7/1967 | Rise | 60/562 |
| 3,350,883 A | * | 11/1967 | Rohlfs | 60/561 |
| 3,554,334 A | * | 1/1971 | Shimano et al. | 188/344 |
| 3,899,057 A | * | 8/1975 | Carre | 188/351 |
| 4,162,616 A | * | 7/1979 | Hayashida | 60/533 |
| 4,421,359 A | * | 12/1983 | Hayashi et al. | 303/9.61 |
| 4,560,049 A | * | 12/1985 | Uchibaba et al. | 192/85 R |
| 4,865,164 A | * | 9/1989 | Kaneda | 188/141 |
| 4,945,728 A | * | 8/1990 | Coleman | 60/562 |
| 5,542,253 A | * | 8/1996 | Ganzel | 60/562 |
| 2003/0020328 A1 | * | 1/2003 | Kusano et al. | 303/114.1 |
| 2006/0185360 A1 | * | 8/2006 | Takizawa et al. | 60/547.1 |

* cited by examiner

*Primary Examiner*—Christopher P Schwartz
(74) *Attorney, Agent, or Firm*—Jeffer Manels Butler & Marmaro LLP

(57) ABSTRACT

A master cylinder assembly for a hydraulic bicycle braking system that includes a master cylinder having a first end and a second end, a first piston having a first end and a second end disposed in and movable within the master cylinder, a second piston disposed in and movable within the master cylinder, and a modulator configured to modulate a first pressure that is applied to the second end of the first piston.

17 Claims, 4 Drawing Sheets

ADJUSTABLE MODULATOR FOR HYDRAULIC BRAKE LEVER ASSEMBLY

FIELD OF THE INVENTION

The present invention relates to hydraulic disc brakes, and more particularly, to a hydraulic disc brake lever assembly preferably for a bicycle that includes an adjustable modulator.

BACKGROUND OF THE INVENTION

In recent years, certain high performance bicycles have included hydraulic disc brakes. Hydraulic disc brake systems typically include a caliper housing, a first movable brake pad and a second fixed or movable brake pad. The movable brake pad is typically attached to a piston that is movable in response to fluid pressure applied via a hydraulic fluid conduit in the caliper housing. The brake pads are positioned on either side of a rotor, which is attached to the front or rear wheel of a bicycle. Upon the application of fluid pressure to the piston or pistons, the brake pads come into contact with the rotor, thereby applying frictional resistance and causing the bicycle to slow down or stop.

Hydraulic disc brake systems for bicycles are typically actuated by a brake lever attached to a bicycle handlebar. They also typically include a master piston in a master cylinder which is actuated by the brake lever. The master cylinder contains a hydraulic fluid and is in fluid communication with the disc brake caliper via a fluid conduit. The brake pads are typically spaced apart from the rotor by a predetermined gap. As the lever is contracted towards the handlebar, the master piston moves, thereby forcing liquid out of the master cylinder and into a conduit connected to the caliper housing. The movement of fluid into the caliper housing causes the pistons to move, eventually bringing the brake pads into contact with the rotor. Once the brake pads contact the rotor, they provide frictional resistance which can be increased by further operation of the lever. At this point, the caliper housing is fully pressurized, and further operation of the lever increases the system hydraulic pressure and frictional resistance applied to the rotor.

However, users of hydraulic disc brake systems that include only a single master piston often find it difficult to control braking after the brake pads contact the rotor because the hydraulic pressure is directly affected by the master piston and nothing else. Therefore, after the brake pads contact the rotor, if the user grips the brake lever harder, thereby causing the hydraulic pressure to increase as a result of the movement of the master piston, the brakes often lock, causing the tire to skid. This is undesirable.

Other hydraulic brake systems have been developed that include two pistons in the master cylinder. For example, see U.S. Patent Application No. US-2006-0185360-A1 to Takizawa et al., the entirety of which is incorporated by reference. This type of hydraulic brake system includes a brake lever that is pivotally attached to a brake housing, a master cylinder in the brake housing that has two fluid containing regions of different diameter and a master piston assembly that has two pistons. The first piston is generally annular in shape and includes a central opening through which a second piston extends. The first and second pistons have different diameters that each correspond to the diameter of one of the two fluid containing regions of the master cylinder.

However, this type of hydraulic brake system has similar braking problems to the single master piston design described above. In this system, the added hydraulic pressure provided by the second piston after the brake pads contact the rotor often causes the brakes to lock and the tire to skid.

Accordingly, a need exists for a hydraulic disc brake lever that addresses the foregoing problems.

SUMMARY OF THE PREFERRED EMBODIMENTS

According to a first aspect of the present invention there is provided a master cylinder assembly for a hydraulic bicycle braking system that includes a master cylinder having a first end and a second end, a first piston having a first end and a second end disposed in and movable within the master cylinder, a second piston disposed in and movable within the master cylinder, and a modulator configured to modulate a first pressure that is applied to the second end of the first piston. In a preferred embodiment, when the first pressure exceeds a pre-determined second pressure, the modulator modulates the volume of a first fluid containing region that is defined between the second end of the first piston and the second end of the master cylinder. Preferably, the modulation is caused by movement of the first piston relative to the second piston.

In accordance with another aspect of the present invention, there is provided a hydraulic brake lever assembly for a bicycle that includes a housing adapted to be attached to a handle bar, a lever pivotably connected to the housing and having a range of travel comprising first and second regions, a master cylinder disposed in the housing and having a first end and a second end, a first piston disposed in and movable within the master cylinder, a second piston disposed in and movable within the master cylinder and operatively connected to the lever, and a modulator disposed between the first piston and at least a portion of the second piston and movable within the master cylinder. A first pressure is applied to the second end of the first piston, and movement of the lever in the second region causes the modulator to modulate the first pressure.

In accordance with yet another aspect of the present invention, there is provided a master cylinder assembly for a hydraulic bicycle braking system that includes a master cylinder having a first end and a second end, a first piston having a first end and a second end disposed in and movable within the master cylinder, a second piston disposed in and movable within the master cylinder that includes a larger diameter portion having a first end and a second end and a smaller diameter portion, and a modulator movable within the master cylinder and disposed between the first end of the first piston and the second end of the larger diameter portion of the second piston. The modulator modulates the distance between the first end of the first piston and the second end of the larger diameter portion of the second piston.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
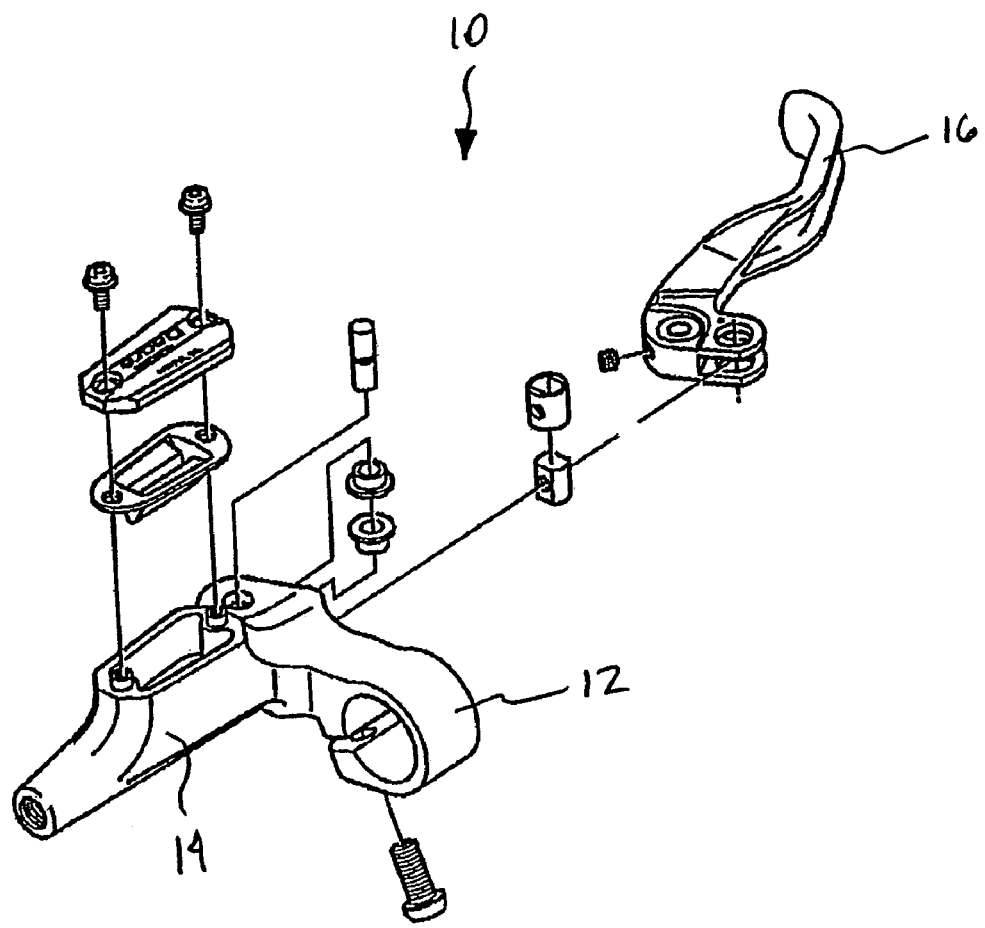
FIG. 1 is an exploded perspective view of a hydraulic disc brake lever assembly.

Referring to FIG. 1, a preferred embodiment of a bicycle brake lever assembly 10 is described. Brake lever assembly 10 is preferably a hydraulic brake lever assembly operatively connected to a hydraulic disc brake system.

Brake lever assembly 10 is preferably attached to a bicycle handlebar by a clamp 12 or other suitable attachment mechanism and generally includes a housing 14 and a brake lever 16. Housing 14 preferably houses a preferred embodiment of a master cylinder assembly 18.

Figure 2:
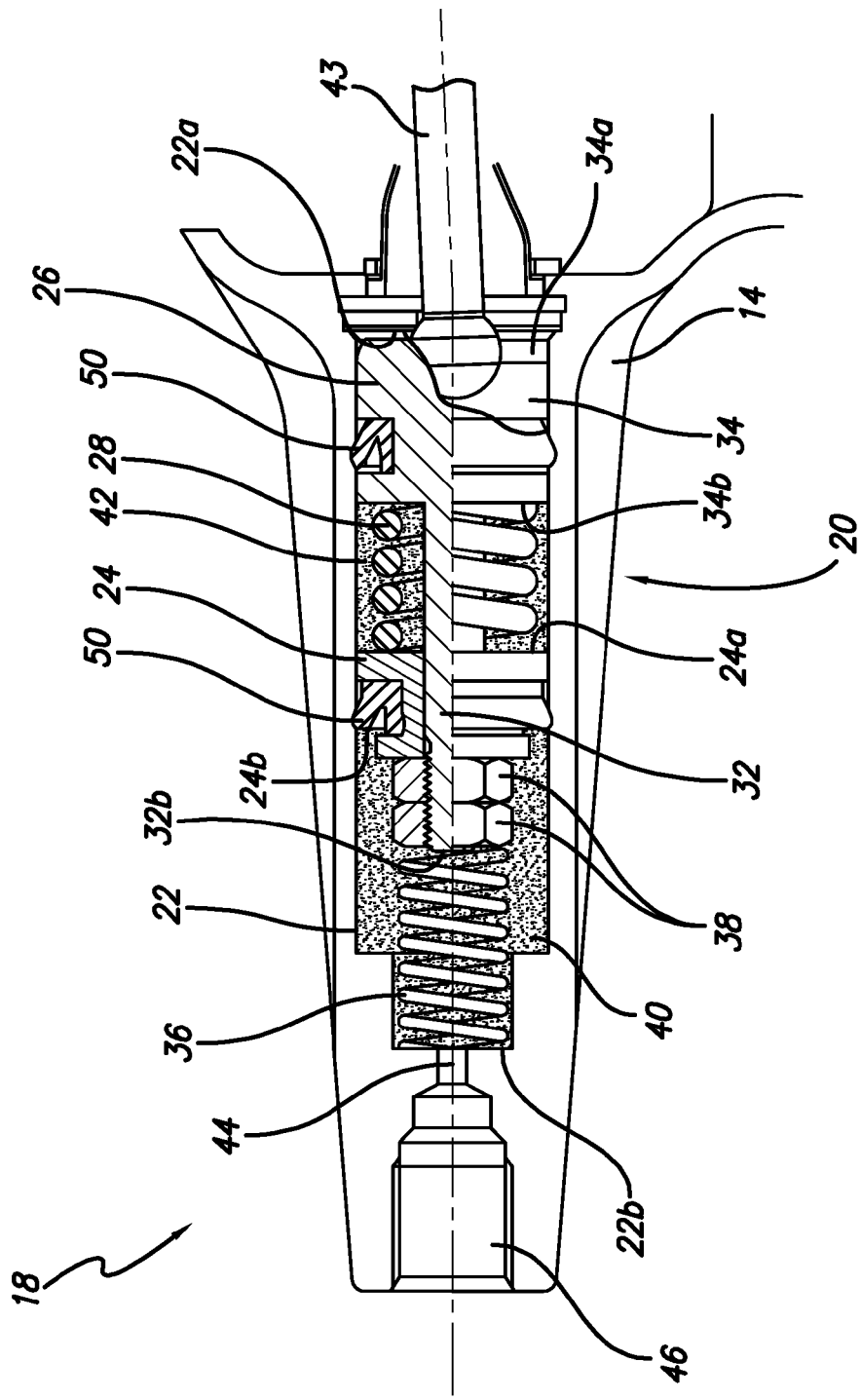
FIG. 2 is an elevational view of a master cylinder assembly including a master piston assembly in a starting or non-compressed position and showing the upper half of the master piston assembly in cross-section, in accordance with a preferred embodiment of the present invention.
Figure 3:
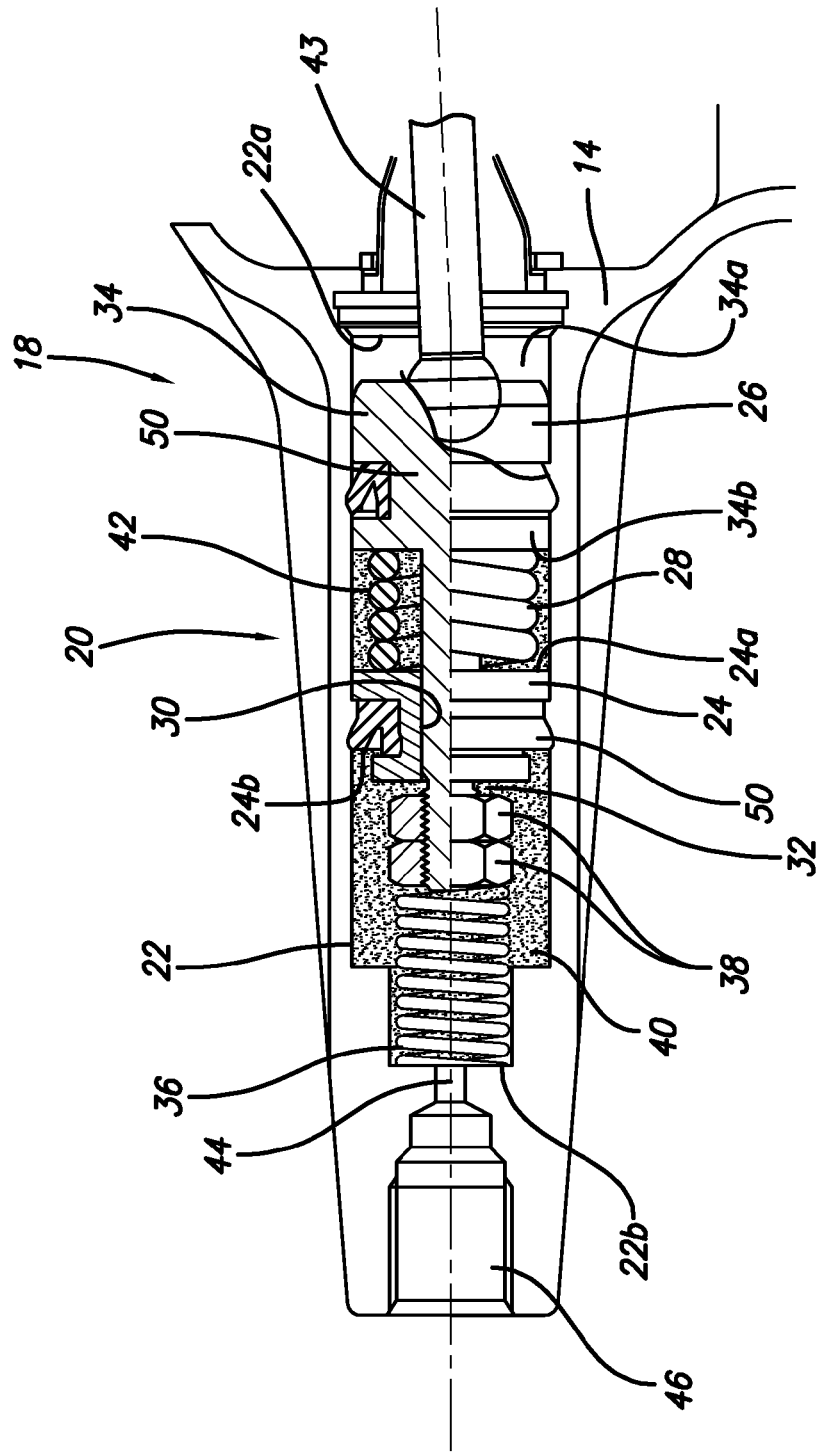
FIG. 3 is an elevational view of the master cylinder assembly of FIG. 2 with the master piston assembly in a compressed position and showing the upper half of the master piston assembly in cross-section.

FIGS. 2-3 show cross-sectional views of a preferred embodiment of master cylinder assembly 18 of the present invention. Master cylinder assembly 18 includes a master piston assembly 20 therein. The two different views of FIGS. 2-3 represent different positions of master piston assembly 20. FIG. 2 depicts master piston assembly 20 in a starting or non-compressed position. FIG. 3 depicts master piston assembly 20 in a compressed position.

As will be described below, the movement of master piston assembly 20 from the starting position to the compressed position is preferably used to force hydraulic fluid from brake lever assembly 10 to a hydraulic disc brake system.

The present invention may be used with a number of hydraulic disc brake systems, including bicycle hydraulic disc brake systems such as those described in U.S. Pat. No. 6,491,144 (the "'144 patent"), the entirety of which is incorporated herein by reference. However, the present invention is not limited to any particular hydraulic system or hydraulic disc brake system. Thus, the disclosure of the '144 patent is referenced herein to illustrate a preferred embodiment of the present invention only. As shown in FIG. 16 of the '144 patent, hydraulic disc brake systems typically comprise a caliper housing and one or more slave pistons which are movable in response to changes in hydraulic fluid pressure applied via hydraulic fluid conduits in the caliper housing. As is also shown, the slave pistons typically include a friction member, such as a brake pad.

FIG. 16 of the '144 patent shows such a hydraulic disc brake system in use on a bicycle. As indicated, in bicycle applications the caliper housing is typically placed proximate a bicycle rotor which is mounted on and rotates with a front or rear wheel of the bicycle. The brake pads are typically positioned on opposite sides of the rotor. When braking is desired, hydraulic pressure is applied to the slave pistons to force the friction members to contact the rotor. The frictional resistance of the friction members against the rotor causes the bicycle wheel to rotate more slowly and eventually to stop rotating.

Figure 4:
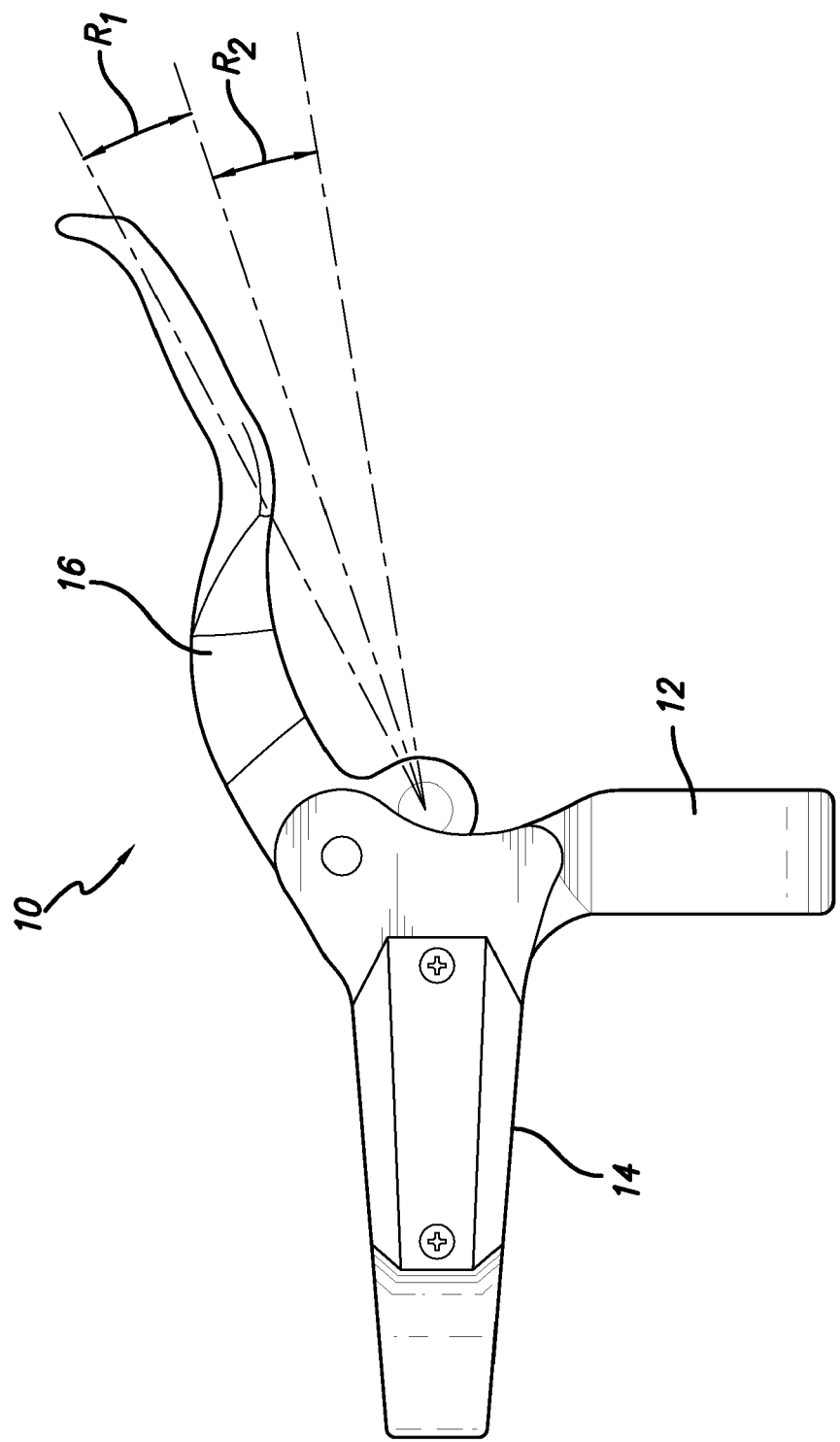
FIG. 4 is a plan view of a hydraulic disc lever assembly showing the lever's range of travel in two regions, in accordance with an embodiment of the present invention.

Furthermore, the inventive master cylinder assembly may be used with a number of different brake lever assemblies or systems. It will be understood that the brake lever assemblies shown in FIGS. 1 and 4 are merely exemplary and are not a limitations on the present invention.

In a preferred embodiment of the present invention, master cylinder assembly 18 is connected to a bicycle hydraulic disc brake system. Master cylinder assembly 18 preferably provides for multi-stage braking, which more preferably is two-stage or dual-stage braking. As shown in FIG. 4, in an especially preferred embodiment, during the first stage of braking, lever 16 is pulled through a first region of its range of travel. In a preferred embodiment, movement through the first region causes the friction member or brake pad to come into contact with the rotor. However, this is not a limitation on the present invention and the first region does not necessarily have to coincide with causing the friction member or brake pad to come into contact with the rotor. For example, the first region may end before the brake pad contacts the rotor. This first region generally comprises from about 30 percent to about 70 percent of the lever's total range of travel, preferably comprises from about 40 percent to about 60 percent of the total range of travel and more preferably comprises from about 45 percent to about 55 percent of the total range of travel. It will be understood that these ranges of travel are merely exemplary and that because a rider can adjust the reach (the distance between the handlebar and the brake lever) on some brake levers, these ranges of travel set forth above can be changed.

In the second stage of braking, lever 16 is pulled through a second region of its range of travel, causing the friction members to provide increasing amounts of pressure and frictional resistance to the rotor.

A preferred embodiment of the master cylinder assembly 18 shown in FIGS. 2-3 will now be described. Master cylinder assembly 18 includes a master cylinder 22 which is generally a cylindrical space defined in housing 14 having a first end 22a and a second end 22b. Master cylinder 22 houses master piston assembly 20, which preferably comprises a first piston 24, a second piston 26 and a modulator 28. First piston 24 is preferably annular in shape, thus defining a longitudinally disposed through-hole 30 therein, and includes a first end 24a and a second end 24b. First piston 24 is preferably sized to closely fit within master cylinder 22 while still being movable with respect to it. Second piston 26 preferably includes a smaller diameter portion 32 and a larger diameter portion 34 with a first end 34a and a second end 34b. Smaller diameter portion 32 preferably extends through through-hole 30.

Through-hole 30 is preferably sized to create a relatively close fit with the outer surface of the smaller diameter portion 32 of second piston 26, while allowing the smaller diameter portion 32 of second piston 26 to move within through-hole 30 in the manner described below.

First and second pistons 24 and 26 preferably each have a circumferential groove around their outer circumferences. A cup or umbrella seal 50 or other suitable means is preferably disposed in the circumferential grooves, which provides a seal between first and second pistons 24 and 26 and master cylinder 22 while allowing first and second pistons 24 and 26 to move within master cylinder 22.

In a preferred embodiment, first piston 24 is operatively connected to second piston 26, preferably via through-hole 30 in first piston 24 in which smaller diameter portion 32 of second piston 26 is disposed. First piston 24 and second piston 26 are also preferably operatively connected by modulator 28. As can be seen in FIGS. 2-3, modulator 28 is preferably disposed between the first end 24a of first piston 24 and the second end 34b of the larger diameter portion 34 of second piston 26.

As shown in FIGS. 2-3, modulator 28 is preferably a spring through which the smaller diameter portion 32 of second piston 26 extends. However, modulator 28 can be any biasing device that provides for relative movement (described more fully below) between first and second pistons 24 and 26. For example, modulator 28 can be any linear-elastic material, such as rubber or the like, that extends between first and second pistons 24 and 26.

Modulator 28 has a pre-determined spring force and biases the first and second pistons 24 and 26 apart. It will be understood by those skilled in the art that the spring force is the force exerted by the spring upon any object which is attached to it (here, the pistons). This force (coupled with the pressure applied to first piston 24 by the hydraulic fluid in first fluid containing region 40 and the pressure applied to second piston 26 by the coupling member 43) acts to keep the pistons in their rest or equilibrium positions. If a pressure (force per unit of area) is applied (in the compression direction of the spring) to either of the pistons that is greater than the spring force, modulator 28 will compress (as shown in FIG. 3 and described more fully below). FIG. 2 shows master piston assembly 20 (and modulator 28) in a starting or non-compressed position. It should be understood that the term "spring force" does not necessarily mean that modulator 28 has to be a spring.

Master cylinder 22 also includes a biasing device or piston spring 36 disposed therein that extends between the second end 22b of master cylinder 22 and the smaller diameter portion 32 of second piston 26 and that biases second piston 26 away from master cylinder second end 22b. It will be understood that piston spring 36 can be any type of biasing device.

In a preferred embodiment, the smaller diameter portion 32 of second piston 26 includes at least one, and preferably a pair, of nuts 38 that are threaded on the end thereof. The nuts 38 act as a stopper for the piston spring 36 on one side and for first piston 24 on the other side. In another embodiment, an e-ring and pin can be used as the stopper. Because the nuts 38 are movable on the smaller diameter portion 32 of second piston 26 the starting position of first piston 24 can be adjusted. In an embodiment with two nuts 38, one nut is preferably for adjusting the starting position of first piston 24 and the other is preferably for securing the other nut in place.

A first fluid containing region 40 is defined within master cylinder 22 between the second end 22b of cylinder 22 and the second end 24b of first piston 24. A portion of first fluid containing region 40 is also defined between the second end 32b of the smaller diameter portion 32 of second piston 26 and second end 22b of master cylinder 22. A second fluid containing region 42 is defined between the first end 24a of first piston 24 and the second end 34b of the larger diameter portion 34 of second piston 26.

To operatively connect lever 16 to master piston assembly 18, one or more coupling members are preferably provided. A variety of different coupling member configurations and geometries may be used, and the coupling member 43 shown in FIGS. 2-3 is merely exemplary.

One end of the coupling member 43 is operatively connected to brake lever 16 (the connection is not shown in the figures) and the other end is rotatably seated in a depression adjacent the first end 26a of second piston 26. As those skilled in the art will understand, pivotal movement of lever 16 causes coupling member 43 to push second piston 26 (and, therefore master piston assembly 20) along the axial direction of master cylinder 22 (in a right to left direction, as shown in the FIGS. 2-3).

As mentioned earlier, the present invention preferably provides for two-stage braking when brake lever assembly 10 is connected to a hydraulic disc brake assembly. In the embodiments of FIGS. 2-3, this two-stage braking is facilitated by the operative connection of first piston 24, second piston 26 and modulator 28. The two stages of braking are facilitated by the first and second ranges of travel of master piston assembly 20.

As described above, FIG. 2 shows master piston assembly 20 (and modulator 28) in a starting or non-compressed position. At this point, brake lever 16 is in a neutral position. In this position, the pressure in the first fluid containing region is relatively low. As master cylinder assembly 20 is moved due to the pivotal movement of lever 16, fluid in first fluid containing region 40 is displaced through exit port 44 into hydraulic conduit attachment 46. Hydraulic conduit attachment 46 is preferably designed to be attachable to a hydraulic conduit such as a hose which may then be connected to a disc brake caliper. If the brake lever assembly 10 is connected to a disc brake assembly such as the one depicted in FIG. 16 of the '144 patent, the displacement of hydraulic fluid into such a hydraulic conduit causes fluid to move into the fluid conduits of the caliper housing (e.g., conduits 37 in FIG. 16 of the '144 patent).

During the first stage of braking or the first region of travel (brake lever 16 is in a first actuating position at this stage), as master piston assembly 20 moves due to the pivotal movement of lever 16, piston spring 36 is compressed and the overall hydraulic system volume which is available for actuating the brake system is reduced. This causes the system pressure to correspondingly increase. If the attached disc brake's fluid conduits are already liquid full, further movement will move the slave piston(s) and the attached brake pads, towards the rotor.

As the pressure continues to rise, more force per unit of area is correspondingly applied to the second end 24b of first piston 24. However, during this first stage, the increasing pressure applied to the second end 24b of first piston 24 is still less than the spring force of modulator 28. Therefore, the distance between the first end 24a of first piston 24 and the second end 34b of the larger diameter portion 34 of second piston 26 remains the same. In other words, the distance between the first end 24a of first piston 24 and the second end 34b of the larger diameter portion 34 of second piston 26 remains the same when lever 16 is in the neutral position and the first actuating position (or the starting position and first region of travel of master piston assembly 20).

As master piston assembly 20 continues to move axially along master cylinder 22 as a result of pivotal movement of lever 16, at a certain point, the hydraulic system pressure exceeds the spring force of modulator 28. At this point, brake lever 16 is in the second actuating position and this begins the second region of the range of travel of master piston assembly 20 (and the second stage of braking). The second stage of braking often occurs after the brake pads have contacted the rotor. However, this is not a limitation on the present invention. At this point, as can be seen in FIG. 3, as a result of the high pressure, first piston 24 moves away from nuts 38, thereby compressing modulator 28. During this second region of travel, first and second pistons 24 and 26 can move relative to another.

During this second stage of braking, the movement of each of the pistons 24 and 26 will depend on the force being applied to brake lever 16 by the rider, among other conditions. In other words, as first piston 24 moves away from the nuts 38, thereby compressing the modulator, the rider is simultaneously applying more force to lever 16 and causing second piston 26 to compress modulator 28 from the other side. This continuous compression from opposite sides, coupled with the conditions of the brake pads against the rotor and the pressure applied by the rider, all allow modulator 28 to modulate or regulate the overall hydraulic system volume. In other words, modulator 28 modulates the hydraulic pressure and therefore modulates the pressure applied to the second end 24*b* of first piston 24.

It will be understood, that as modulator 28 is being compressed (after the pressure in the first fluid containing region 40 has exceeded the pre-selected pressure at which the modulator begins to compress), if the rider is still applying more force to lever 16, the second end 32*b* of smaller diameter portion 32 of second piston 26 is still pushing fluid out of first fluid containing region 40 and through exit port 44, which, in turn, causes the brake pads to squeeze the rotor. However, because the diameter of smaller diameter portion 32 is less than the diameter of first piston 24, the amount of fluid pushed through port 44 is less than it was before modulator 28 began to compress, thus providing controlled braking.

Those skilled in the art will appreciate that this provides "soft" or more controlled braking. Under optimum conditions, the pre-selected pressure at which the modulator begins to compress (which directly coincides with the pre-selected spring force of the modulator) will provide for sufficient braking while preventing the brakes from locking.

During compression of modulator 28, some of the hydraulic fluid in second fluid containing region 42 is pushed through a port and into a reserve tank (not shown).

It will be understood that as lever 16 is moved from the neutral position through the first actuating position and to the second actuating position, piston spring 36 compresses and modulator 28 does not. However, once the pressure in the system reaches a pre-selected pressure, the overall force applied to first piston 24 (and, therefore, modulator 28) becomes high enough that modulator 28 compresses.

As discussed above, the present invention provides for controlled and smooth braking. To provide even further adjustability, depending on, for example, the rider's preference, the modulator can be changed. In other words, different modulators with different spring forces or spring constants can be provided. The differences between the modulators can provide for "softer" or "harder" braking.

The embodiments described above are exemplary embodiments of a present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A master cylinder assembly for a hydraulic bicycle braking system comprising:
    a master cylinder having a first end and a second end;
    a first piston disposed in and movable within the master cylinder, wherein the first piston has a first end, a second end and an axially aligned through hole;
    a second piston disposed in and movable within the master cylinder, wherein the second piston includes a larger diameter portion and a smaller diameter portion having a distal end that extends through the hole in the first piston;
    a first fluid containing region at least partially defined by the second end of the first piston, the distal end of the smaller diameter portion of the second piston and the second end of the master cylinder, wherein the first fluid containing region includes an outlet that extends outside of the master cylinder, and wherein a first pressure is applied to the second end of the first piston by the fluid in the first fluid containing region; and
    a modulator configured to modulate the first pressure.

2. The master cylinder assembly for a hydraulic bicycle braking system of claim 1 further comprising a piston spring disposed between the distal end of the second piston and the second end of the master cylinder, wherein when the first pressure exceeds a pre-determined second pressure, the modulator modulates the volume of the first fluid containing region.

3. The master cylinder assembly for a hydraulic bicycle braking system of claim 2 wherein the modulation is caused by movement of the first piston relative to the second piston.

4. The master cylinder assembly for a hydraulic bicycle braking system of claim 2 further comprising a second fluid containing region defined between the first piston and the second piston, wherein the modulator also modulates the volume of the second fluid containing region.

5. The master cylinder assembly for a hydraulic bicycle braking system of claim 1 wherein the modulator is disposed between the first piston and the larger diameter portion of the second piston and is movable within the master cylinder.

6. The master cylinder assembly for a hydraulic bicycle braking system of claim 5 wherein the modulator comprises an elastic material.

7. The master cylinder assembly for a hydraulic bicycle braking system of claim 6 wherein the modulator comprises a spring, and wherein the spring biases the first piston away from the larger diameter portion of the second piston in an axial direction.

8. The master cylinder assembly for a hydraulic bicycle braking system of claim 6 wherein the modulator is comprised of rubber, and wherein one end of the modulator contacts the first end of first piston and other end of the modulator contacts the second piston.

9. A hydraulic brake lever assembly for a bicycle comprising;
    a housing adapted to be attached to a handle bar;
    a lever pivotably connected to the housing and having a range of travel comprising first and second regions;
    a master cylinder disposed in the housing and having a first end and a second end;
    a first piston disposed in and movable within the master cylinder, wherein the first piston has a first end, a second end and an axially aligned through hole, and wherein a first pressure is applied to the second end of the first piston;
    a second piston disposed in and movable within the master cylinder, wherein the second piston includes a larger diameter portion and a smaller diameter portion having a distal end that extends through the hole in the first piston, and wherein the second piston is operatively connected to the lever;
    a first fluid containing region at least partially defined by the second end of the first piston, the distal end of the smaller diameter portion of the second piston and the second end of the master cylinder, wherein the first fluid containing region includes an outlet that extends outside of the master cylinder; and
    a modulator disposed between the first piston and at least a portion of the second piston and movable within the master cylinder;
    wherein movement of the lever in the second region causes the modulator to modulate the first pressure.

10. The hydraulic brake lever assembly for a bicycle of claim 9 wherein movement of the lever in the second region causes the modulator to modulate the volume of the first fluid containing region.

11. The hydraulic brake lever assembly for a bicycle of claim 10 wherein the modulation is caused by movement of the first piston relative to the second piston.

12. The hydraulic brake lever assembly for a bicycle of claim 11 wherein the modulator comprises a spring, and wherein the spring biases the first piston away from second piston in the axial direction.

13. A master cylinder assembly for a hydraulic bicycle braking system comprising:
   a master cylinder having a first end and a second end;
   a first piston having a first end and a second end disposed in and movable within the master cylinder;
   a second piston disposed in and movable within the master cylinder, wherein the second piston includes a larger diameter portion and a smaller diameter portion, wherein the larger diameter portion has a first end and a second end and the smaller diameter portion has a distal end;
   a modulator movable within the master cylinder and disposed between the first end of the first piston and the second end of the larger diameter portion of the second piston; and
   a first fluid containing region at least partially defined by the second end of the first piston, the distal end of the smaller diameter portion of the second piston and the second end of the master cylinder, wherein the first fluid containing region includes an outlet that extends outside of the master cylinder,
   wherein the modulator modulates the distance between the first end of the first piston and the second end of the larger diameter portion of the second piston.

14. The master cylinder assembly for a hydraulic bicycle braking system of claim 13 wherein the first piston defines a through-hole, and wherein the smaller diameter portion of the second piston extends through the through-hole.

15. The master cylinder assembly for a hydraulic bicycle braking system of claim 14 further comprising a piston spring that biases the second piston away from the second end of the master cylinder.

16. The master cylinder assembly for a hydraulic bicycle braking system of claim 15 wherein the smaller diameter portion of the second piston includes a stopper on an end thereof, and wherein the piston spring is in contact with the stopper.

17. The master cylinder assembly for a hydraulic bicycle braking system of claim 16 wherein the stopper comprises at least one nut that is threaded on the end of the smaller diameter portion.

* * * * *